US005845397A

United States Patent [19]
Reedy et al.

[11] Patent Number: 5,845,397
[45] Date of Patent: Dec. 8, 1998

[54] STATIC TIMING METHOD FOR HEAVY DUTY DIESEL ENGINES

[75] Inventors: Steven W. Reedy, Nashville; Kristopher R. Bare, Columbus, both of Ind.; Randal L. Myers, Randolph, N.Y.

[73] Assignee: Cummins Engine Company, Inc., Columbus, Ind.

[21] Appl. No.: 803,874

[22] Filed: Feb. 21, 1997

[51] Int. Cl.$^6$ .................................................... B23P 13/00

[52] U.S. Cl. .................................. 29/888.011; 29/888.01; 29/281.5

[58] Field of Search .......................... 29/888.01, 888.011, 29/281.5

[56] References Cited

U.S. PATENT DOCUMENTS

| | | | |
|---|---|---|---|
| 1,375,067 | 4/1921 | Short | 123/90.31 |
| 2,011,571 | 8/1935 | Duncan | 123/90.15 |
| 3,262,435 | 7/1966 | Cribbs | 123/90.15 |
| 3,388,614 | 6/1968 | De Coye De Castelet | 74/567 |
| 4,177,773 | 12/1979 | Cribbs | 123/90.15 |
| 4,570,334 | 2/1986 | Melzer et al. | 29/888.01 |
| 4,996,768 | 3/1991 | Seyller | 29/888.01 |
| 5,099,563 | 3/1992 | Strusch | 29/281.5 |
| 5,425,168 | 6/1995 | Bumbaco et al. | 29/888.011 |

FOREIGN PATENT DOCUMENTS

| | | | |
|---|---|---|---|
| 532377 | 3/1993 | European Pat. Off. | 29/888.01 |
| 3832812 A1 | 3/1990 | Germany . | |

*Primary Examiner*—Weilun Lo
*Attorney, Agent, or Firm*—Sixbey, Friedman, Leedom & Ferguson; Charles M. Leedom, Jr.; Tim L. Brackett, Jr.

[57] ABSTRACT

A method and apparatus for providing an improved static timing between a crankshaft and a camshaft in an internal combustion engine. The crankshaft and camshaft are locked into predetermined rotational positions to set the desired timing between the crankshaft and camshaft. The camshaft is locked into its predetermined rotational position using a camshaft timing member positioned between a flat portion formed on an outer peripheral surface of camshaft and an adjacent portion of said engine, such as the cylinder head. This positioning of the camshaft timing member prevents the camshaft from rotating and locks the camshaft into the desired predetermined rotational position for setting the static timing with respect to the crankshaft. The crankshaft in locked into its predetermined position using a crankshaft timing pin inserted through the engine block and positioned into a slot formed in a counterweight on the crankshaft. The slot in the counterweight is shaped so as to fittingly receive the crankshaft timing pin. The crankshaft timing pin prevents the crankshaft from rotating and locks the crankshaft into the desired predetermined rotational position for setting the static timing with respect to the camshaft. Once the crankshaft and camshaft are locked into their desired predetermined positions, the static timing between the crankshaft and camshaft is precisely achieved and the engine is timed correctly.

32 Claims, 5 Drawing Sheets

STATIC TIMING METHOD FOR HEAVY DUTY DIESEL ENGINES

BACKGROUND OF THE INVENTION

TECHNICAL FIELD

The present invention relates to a method and apparatus for accurately setting the timing of the fuel injection event in an internal combustion engine relative to the piston position. More particularly, the present invention relates to a static timing method and apparatus which sets the static timing between a crankshaft and a camshaft in the internal combustion engine during engine assembly or engine service.

BACKGROUND ART

In internal combustion engines, it is important to accurately calibrate the timing of operation of various engine components relative to the engine piston position to achieve effective and efficient operation of the engine. Many of these components, such as unit fuel injectors and cylinder intake and exhaust valves, are operated by cams mounted on a camshaft driven by the engine crankshaft. The timing of the fuel injection event relative to the piston position is particularly critical to maximize engine performance while minimizing exhaust emissions. Improper timing of operation of injectors and valves in newly manufactured engines and in repaired engines impairs engine performance and can result in damage to a driving gear. In order to ensure proper timing of these components, and thus the fuel injection event, the angular position of the camshaft must be set relative to the angular position of the crankshaft. Attempts to ensure proper timing of the fuel injection event relative to the piston position during engine assembly have involved complicated or inaccurate procedures. Further, during engine service, the exact timing of the camshaft and crankshaft relative to each other is often altered when parts are installed or removed from the engine.

One such device for timing the valves of an internal combustion engine is disclosed in U.S. Pat. No. 5,099,563 to Strusch. Strusch discloses holding the driving crankshaft and the driven camshaft in immovable positions, and subsequently fastening a force-transmitting element, such as a chain or gear drive, to the immovably fixed shafts. The camshaft and crankshaft are each held in immovable positions by screwing adjusting pins into the crankcase of the engine and into contact with the camshaft and crankshaft. The crankshaft is immovably fixed by inserting an adjusting pin bolt through a hole provided in the crankcase and screwing the adjusting pin bolt into a threaded hole in the cylindrical shaft portion of the crankshaft. The camshaft is immovably fixed by an adjusting pin that is screwed into an opening through the crankcase and extends into a hole provided in the camshaft for the adjusting pin.

By locking the camshaft and crankshaft in an immovable position using an adjusting pin that must be screwed into a threaded opening, such as the method employed by Strusch, the manufacturing tolerances of the openings must be very small to precisely align the openings to accommodate the threaded adjusting pins, thereby requiring an unnecessarily high degree of control of the positioning of the openings in the shafts adjacent to openings in the crankcase. Furthermore, by inserting the adjusting pin through the crankcase and into a slot in the cylindrical shaft portion of the crankshaft, the engagement point of the pin to the crankshaft slot is positioned a short radial distance from the crankshaft centerline. Manufacturing tolerances necessarily exist when forming the slot. The short radial distance from the slot to the crankshaft centerline cause the manufacturing tolerances to have an unnecessarily large impact on the variation between the actual position of the slot and the desired angular position of the crankshaft. Since the position of the slot determines the actual angular positioning of the crankshaft when the adjusting pin is inserted into the slot, the variation between the actual position of the slot and the desired angular position of the crankshaft causes the angular position of the crankshaft relative to the angular position of the camshaft to deviate from their desired relative angular positioning. This deviation results in an inaccurate static timing setting between the crankshaft and the camshaft.

Therefore, there is a need for a system for accurately setting the timing between a crankshaft and a camshaft in an internal combustion engine which reduces the angular variation between the desired angular position of the shafts and the reference points formed on the shaft for setting the proper timing of the shafts relative to each other. Further, there is a need for a simpler and more accurate method of setting the timing between a crankshaft and a camshaft to reduce the amount of labor and costs associated with setting the timing during assembly and repair.

SUMMARY OF THE INVENTION

It is an object of the present invention to overcome the aforementioned shortcomings associated with the prior art.

Another object of the present invention is to provide in improved static timing method and apparatus for an internal combustion engine which more accurately sets the timing between a crankshaft and a camshaft in the engine.

Yet another object of the present invention is to provide an improved static timing method and apparatus for an internal combustion engine which improves the static timing of the crankshaft with respect to the camshaft by reducing the angular variation between the shafts when aligning the crankshaft and camshaft with respect to each other when setting the timing.

Still another object of the present invention is to provide an improved static timing method and apparatus for an internal combustion engine which provides a simple and effective method of setting the timing between the crankshaft and the camshaft to reduce the amount of labor and costs associated with setting the timing during assembly and engine service.

These as well as additional objects and advantages of the present invention are achieved by providing a method and apparatus for providing an improved static timing between a crankshaft and a camshaft in an internal combustion engine in order to accurately time the fuel injection event relative to the position of a piston in the engine. A crankshaft is provided for driving a camshaft, preferably through a gear assembly. The crankshaft includes at least one counterweight attached to the shaft. The crankshaft and camshaft are locked into a predetermined position to set the desired timing between the crankshaft and camshaft using a crankshaft timing pin and camshaft timing member, respectively. The camshaft timing member is positioned between a portion of the camshaft and an adjacent portion of said engine, such as the cylinder head. The camshaft timing member includes a flat tapered side and a rounded edge on the opposing side of the camshaft timing member from the flat tapered side. The flat tapered side of the camshaft timing member is positioned to abut a flat portion formed on the peripheral surface of the camshaft, while the rounded side of the camshaft timing member abuts a rounded adjacent portion formed in the engine. This positioning of the camshaft timing member prevents the camshaft from rotating and locks the camshaft into the desired predetermined rotational position for setting the static timing with respect to the crankshaft.

A crankshaft timing pin is inserted through an engine block and positioned into a slot formed in a counterweight on the crankshaft. The slot in the counterweight is shaped so as to fittingly receive the crankshaft timing pin. The crankshaft timing pin and the slot may be tapered to improve their engagement together when positioning the crankshaft timing pin into the slot in the counterweight, thereby reducing the variation between the actual position of the slot and the desired angular position of the crankshaft. The crankshaft timing pin prevents the crankshaft from rotating and locks the crankshaft into the desired predetermined rotational position for setting the static timing with respect to the camshaft. Once the crankshaft and camshaft are locked into their desired predetermined positions, the static timing between the crankshaft and camshaft is precisely achieved and the engine is timed correctly. The driving gears are then installed between the crankshaft and the camshaft. After installation of the driving gears is complete, the crankshaft and camshaft timing pins are easily removed.

DETAILED DESCRIPTION OF THE PREFERRED EMBODIMENT

Figure 1:
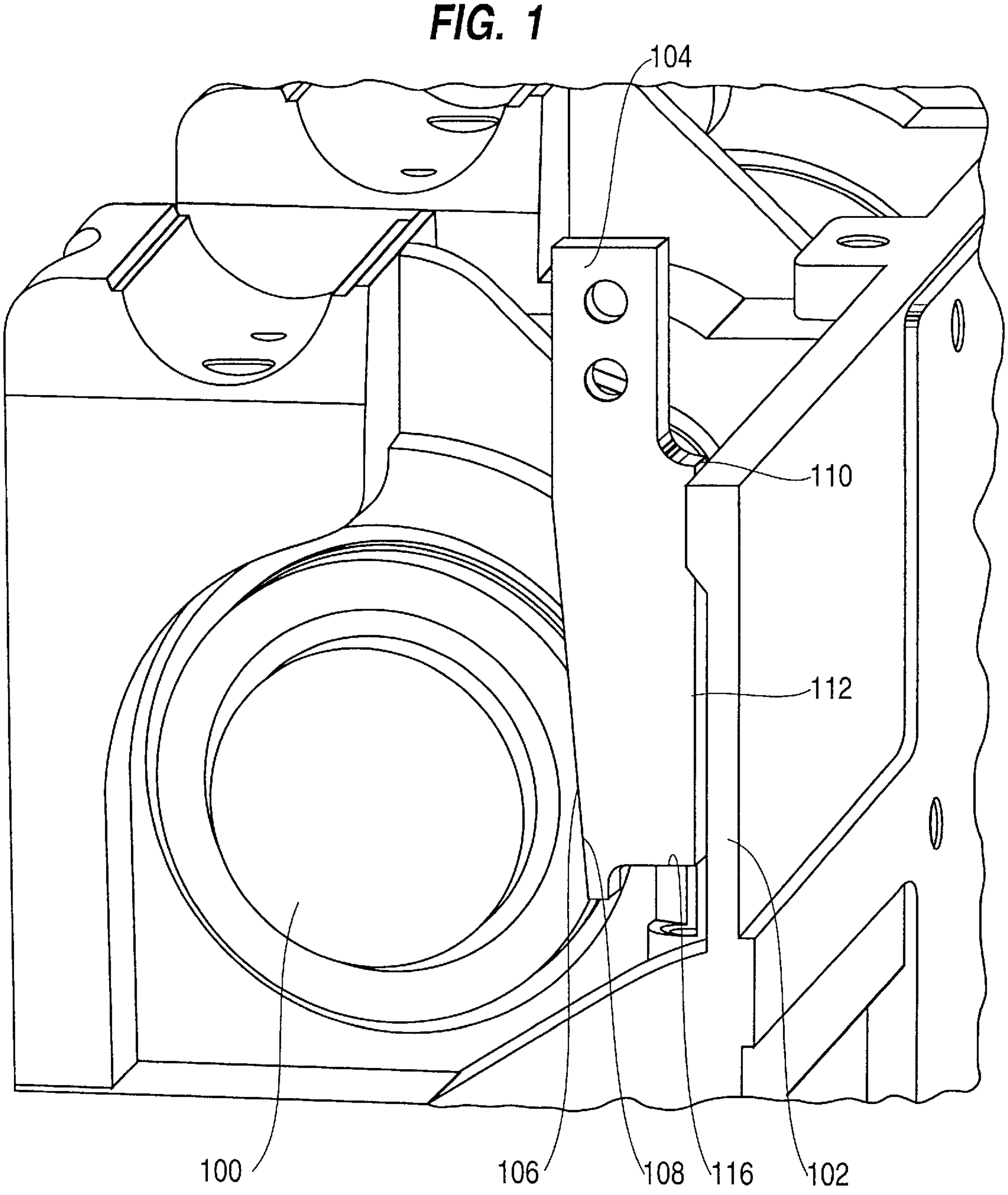
FIG. 1 is a sectional perspective view showing the camshaft timing pin being positioned between the camshaft and cylinder head in accordance with a preferred embodiment of the present invention.
Figure 2:
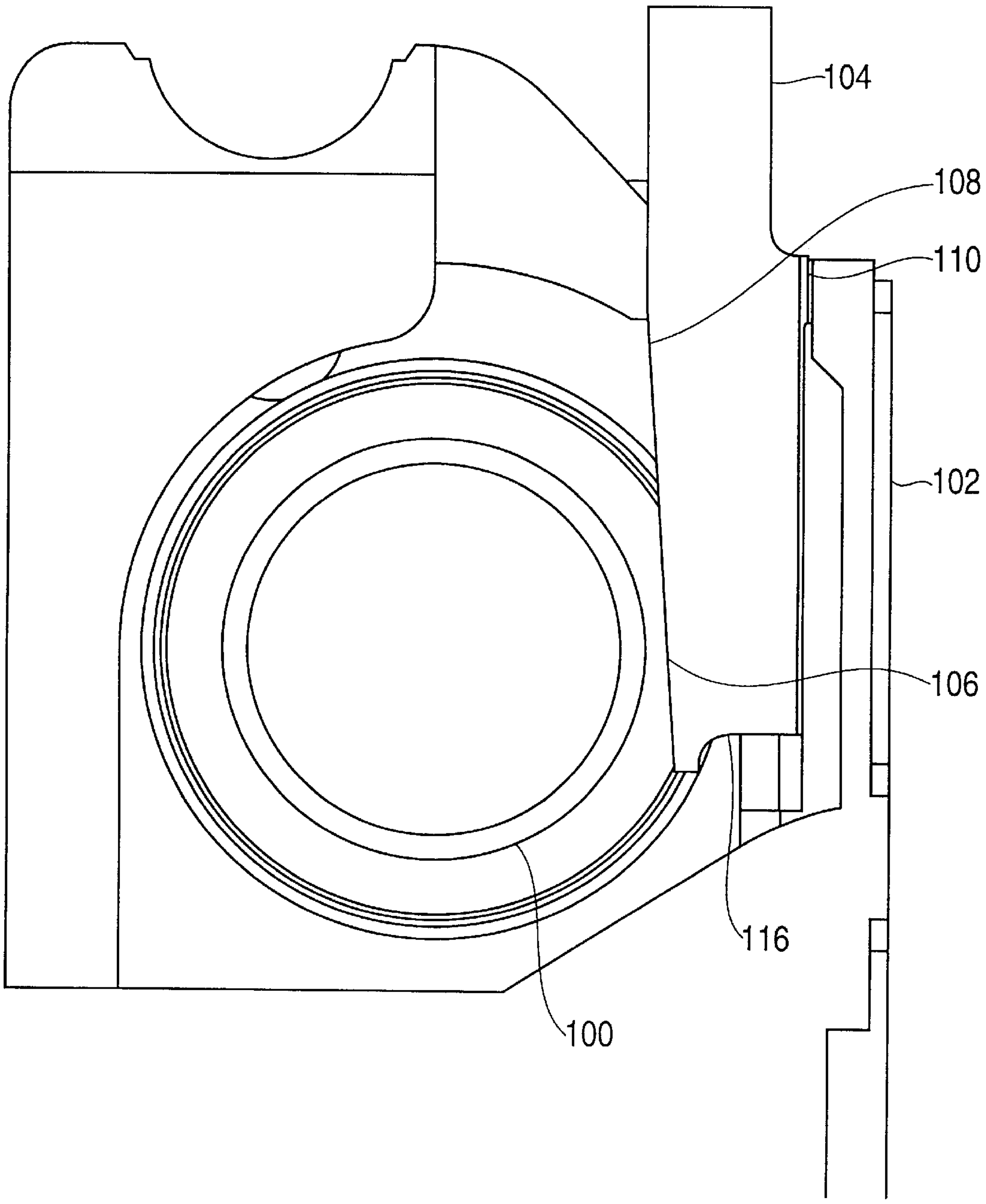
FIG. 2 is a sectional side view showing the camshaft timing pin being positioned between the camshaft and cylinder head in accordance with a preferred embodiment of the present invention.
Figure 3:
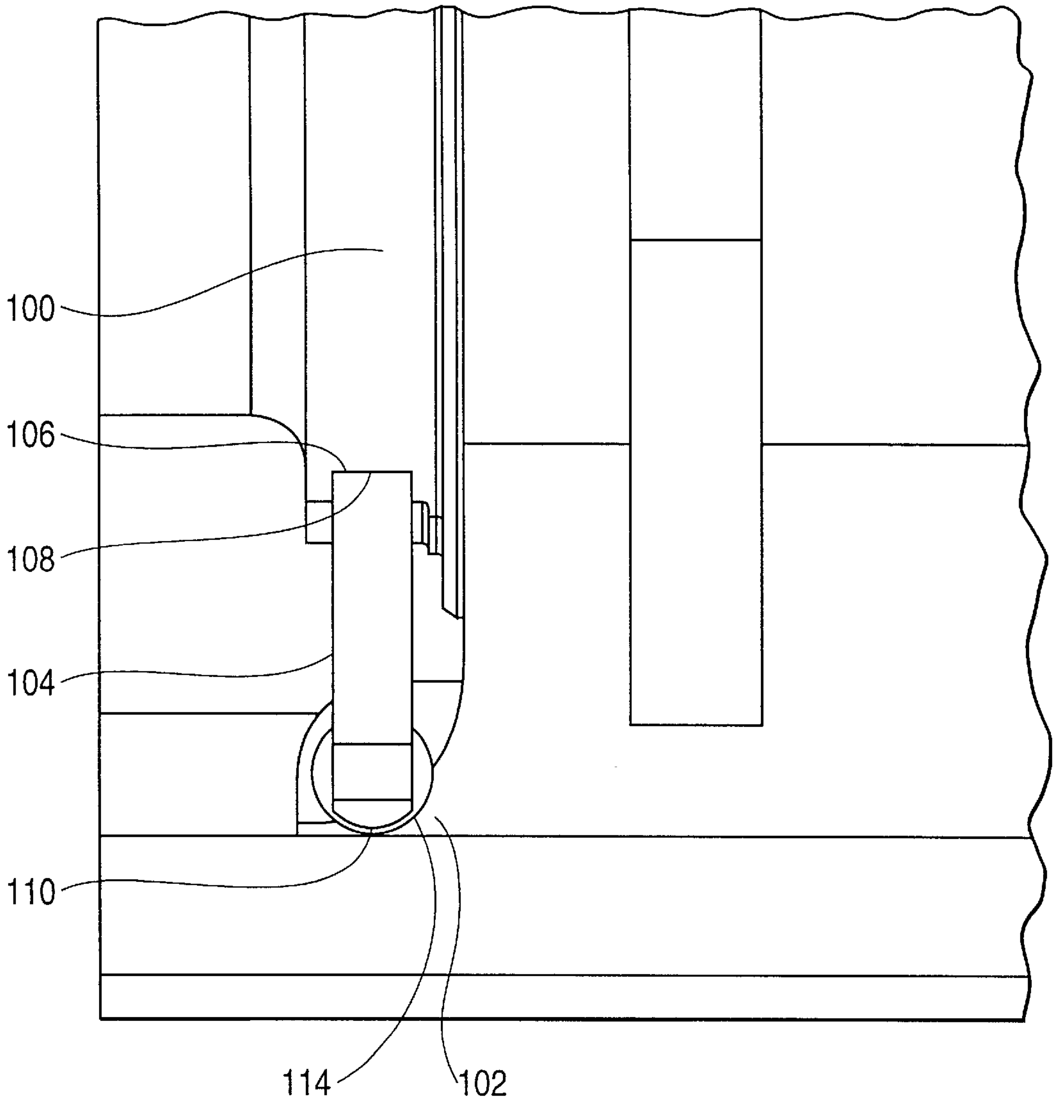
FIG. 3 is an enlarged sectional top view showing the camshaft timing pin being positioned between the camshaft and cylinder head in accordance with a preferred embodiment of the present invention.

Referring now to FIGS. 1 and 2, sectional views of the camshaft 100 and cylinder head 102 for an internal combustion are shown having a camshaft timing member 104 positioned relative to the camshaft 100 and a portion of the engine, such as the cylinder head 102, to hold the camshaft 100 in a predetermined stationary position. While the following description will refer to the camshaft timing member 104 being positioned against the cylinder head 102, it is understood to those skilled in the art that the camshaft timing member 104 may be positioned against any portion of the engine adjacent to the camshaft 100, depending upon the location of the camshaft 100 within the engine. The camshaft 100 includes a flat portion 106 formed along the periphery of the camshaft 100. The camshaft timing member 104 is positioned between the flat portion 106 of the camshaft 100 and the cylinder head 102. The camshaft timing member 104 includes a flat side 108 and a rounded edge 110 on an opposing side 112 of the camshaft timing member 104 from the flat side 108, where the flat side 108 is preferably formed having a linearly tapered surface. During assembly or service of the engine when the camshaft 100 is accessible, the camshaft 100 is rotated until the camshaft timing member 104 can be inserted between the camshaft 100 and the cylinder head 102. The rounded edge 110 of the camshaft timing member 104 is receivable within a similarly shaped rounded portion 114, such as a semicircle or the like, formed in the cylinder head 102, and the flat tapered side 108 of the camshaft timing member 104 may be positioned to abut the flat portion 106 formed on the camshaft 100 once the camshaft 100 is rotated into its desired position for setting the static timing of the engine. As can be seen from the top view of the sectioned camshaft 100 and cylinder head 102 assembly shown in FIG. 3, the rounded edge 110 of the camshaft timing member 104 is matingly received by the rounded portion 114 in the cylinder head 102. Thus, the rounded portion 114 provides a groove to assist in guiding the camshaft timing member 104 as it is inserted between the camshaft 100 and cylinder head 102 in order to allow the camshaft timing member 104 to be installed into place in a simple and convenient manner. The rounded portion 114 of the cylinder head 102 also ensures that the camshaft timing member 104 is consistently positioned in a precise relationship between the camshaft 100 and cylinder head 102, since the rounded edge 110 of camshaft timing member 104 matingly engages the rounded portion 114.

The tapered side 108 of the camshaft timing member 104 is linearly angled so that the width of the camshaft timing member 104 decreases as the camshaft timing member 104 extends toward its lower end 116. The tapered shape of the camshaft timing member 104 allows it to be easily inserted between the camshaft 100 and cylinder head 102 until the camshaft timing member 104 engages both the flat portion 106 of the camshaft 100 and the rounded portion 114 of the cylinder head 102. The camshaft timing member 104 is, in effect, wedged between the camshaft 100 and cylinder head 102 in order to prevent the camshaft 100 from rotating and locks the camshaft 100 into the desired predetermined position for setting the static timing with respect to the crankshaft 200.

The flat portion 106 of the camshaft 100 is preferably formed at the same time as the cams (not shown) on the camshaft 100 are formed. Since the location of the flat portion 106 determines how the camshaft 100 will be positioned when the camshaft timing member 104 is installed, the location of the flat portion 106 is critical in determining the timing of the camshaft 100 with respect to the crankshaft 200. By forming the flat portion 106 at the same time as the profile of the cams are formed, a precise relationship between the profile of the cams and the location of the flat portion 106 can be achieved to reduce the angular variation between the flat portion 106 and the cams on the camshaft 100, thus providing a more accurate timing between the camshaft 100 and crankshaft 200 than previously possible. Conventionally, a keyway or reference point indicating the orientation of the camshaft was formed on the camshaft at a time after the cams have been formed on the camshaft. The keyway would then be used to align the camshaft when trying to set the timing of the camshaft with respect to the crankshaft. Since an additional manufacturing setup including maneuvering of the camshaft with respect to the keyway-forming machinery is required, it is difficult to accurately maintain the rotational orientation of the camshaft with respect to the keyway when forming the keyway at a time after the cams have been formed. The angular variation between the actual location of the keyway and the desired rotational position of the camshaft when using a keyway as a reference point is as high as ¼°. On the other hand, forming the flat portion 106 on the camshaft 100 in a single manufacturing setup when the cams are formed, as in the present invention, reduces the angular variation between the flat portion 106 and the desired rotational orientation of the camshaft 100 for proper timing to ⅛° or lower. Thus, forming the flat portion 106 of the camshaft 100 at the same time as when the cams are formed reduces the variation between the desired rotational position of the camshaft 100 for proper timing and the actual rotational position of the camshaft 100 when the camshaft timing member 104 is positioned against flat portion 106, thereby achieving a more accurate static timing between the camshaft 100 and the crankshaft 200.

Figure 4:
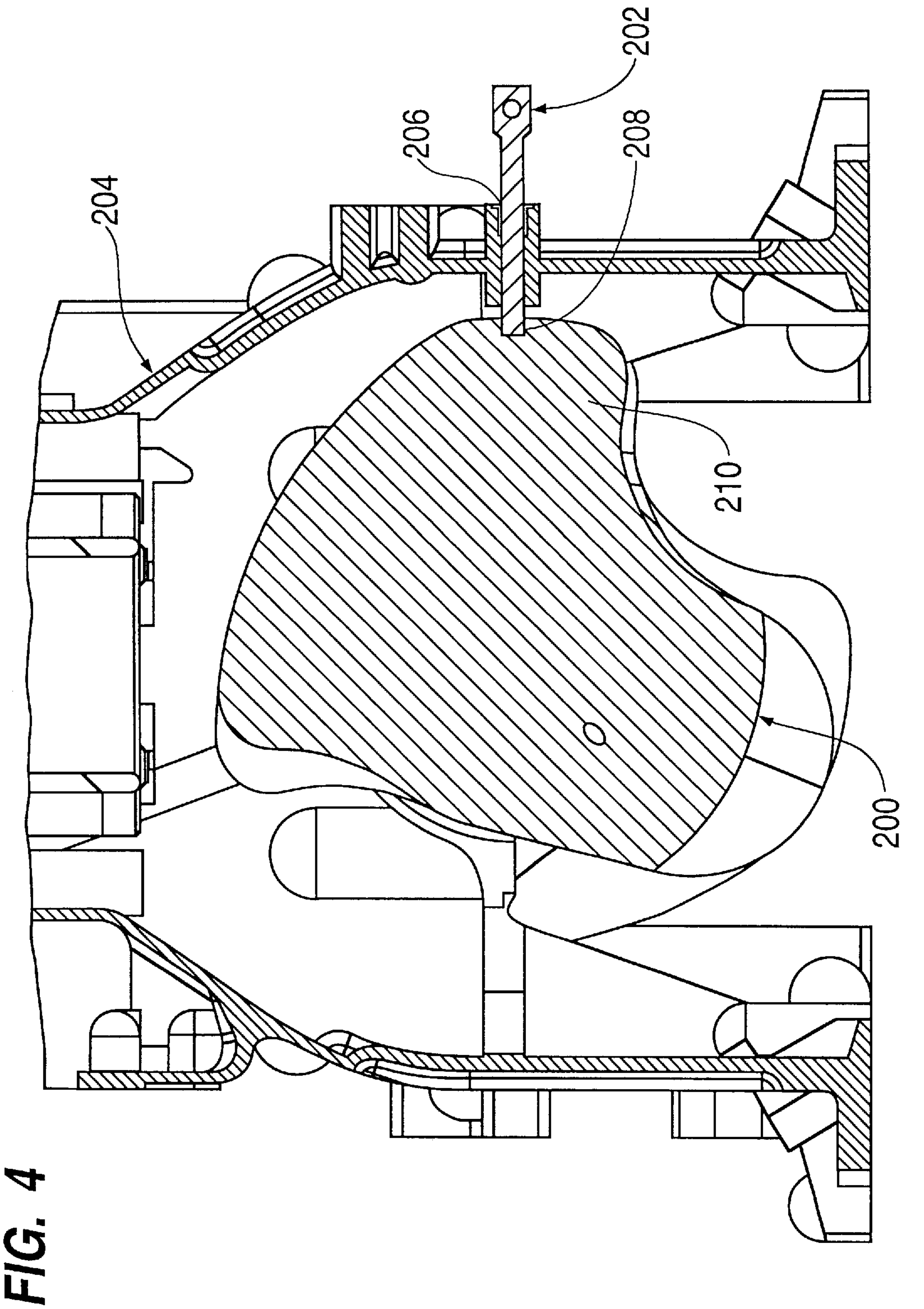
FIG. 4 is a sectional side view showing the crankshaft timing pin being positioned through the engine block and into the crankshaft in accordance with a preferred embodiment of the present invention.

Referring now to FIG. 4, the positioning of the crankshaft timing pin 202 with respect to the crankshaft 200 and engine block 204 is illustrated. The crankshaft timing pin 202 is inserted through an opening 206 in the engine block 204 and received within a slot 208 formed in a counterweight 210 on the crankshaft 200. The crankshaft timing pin 202 and the slot 208 in the counterweight 210 are preferably similarly shaped so that the slot 208 fittingly receives the crankshaft timing pin 202. However, slot 208 may include any shape having side surfaces which engage the crankshaft timing pin 202 to prevent rotational movement of the crankshaft 200. When the crankshaft 200 is rotated into the desired position for proper timing, the crankshaft timing pin 202 can be inserted through the opening 206 formed in the engine block 204 and into the slot 208 in the counterweight 210. Thus, the crankshaft timing pin 202 is held in a fixed relationship with respect to the engine block 204 and the crankshaft 200 and locks the crankshaft 200 into the desired predetermined position for setting the static timing between the crankshaft 200 and the camshaft 100.

By forming the slot 208 in the crankshaft counterweight 210, the angular variation between the location of the slot 208 and the desired angular position of the crankshaft 200 is greatly reduced as compared with similar openings formed closer to the crankshaft 200 centerline due to the increased radial distance of the slot 208 formed in the counterweight 210 from the crankshaft 200 centerline. The angular variation of the positioning of the slot 208 is a function of the radial distance of the slot 208 from the crankshaft 200 centerline, wherein the radial distance of the slot 208 from the crankshaft 200 centerline and the angular variation are inversely proportional so that an increased radial distance of the slot 208 from the crankshaft 200 centerline will result in a reduced angular variation between the slot 208 and the desired angular position of the crankshaft 200 for proper timing. For instance, if the radial distance of the slot 208 from the crankshaft 200 centerline is increased while maintaining the same manufacturing tolerances for the slot 208, then the side surfaces of the slot 208 for the maximum width of the slot 208 based on the manufacturing tolerances will form a much smaller angle with respect to one another extending from the crankshaft 200 centerline than the angle which would result from the slot 208 being formed closer to the crankshaft 200 centerline. Thus, the smaller angle resulting from the increased radial distance of the slot 208 from the crankshaft 200 centerline provides for better timing control of the crankshaft 200 by reducing the angular variation between the angular position of the slot 208 and the desired angular position of the crankshaft 200. This increased radial distance of the slot 208 also allows the slot 208 to be more easily aligned adjacent to the opening 206 in the engine block 204 to receive the crankshaft timing pin 202. Thus, the desired positioning of the crankshaft 200 for setting the static timing of the engine can be accurately, quickly and easily accomplished by forming the slot 208 in the counterweight 210.

Figure 5:
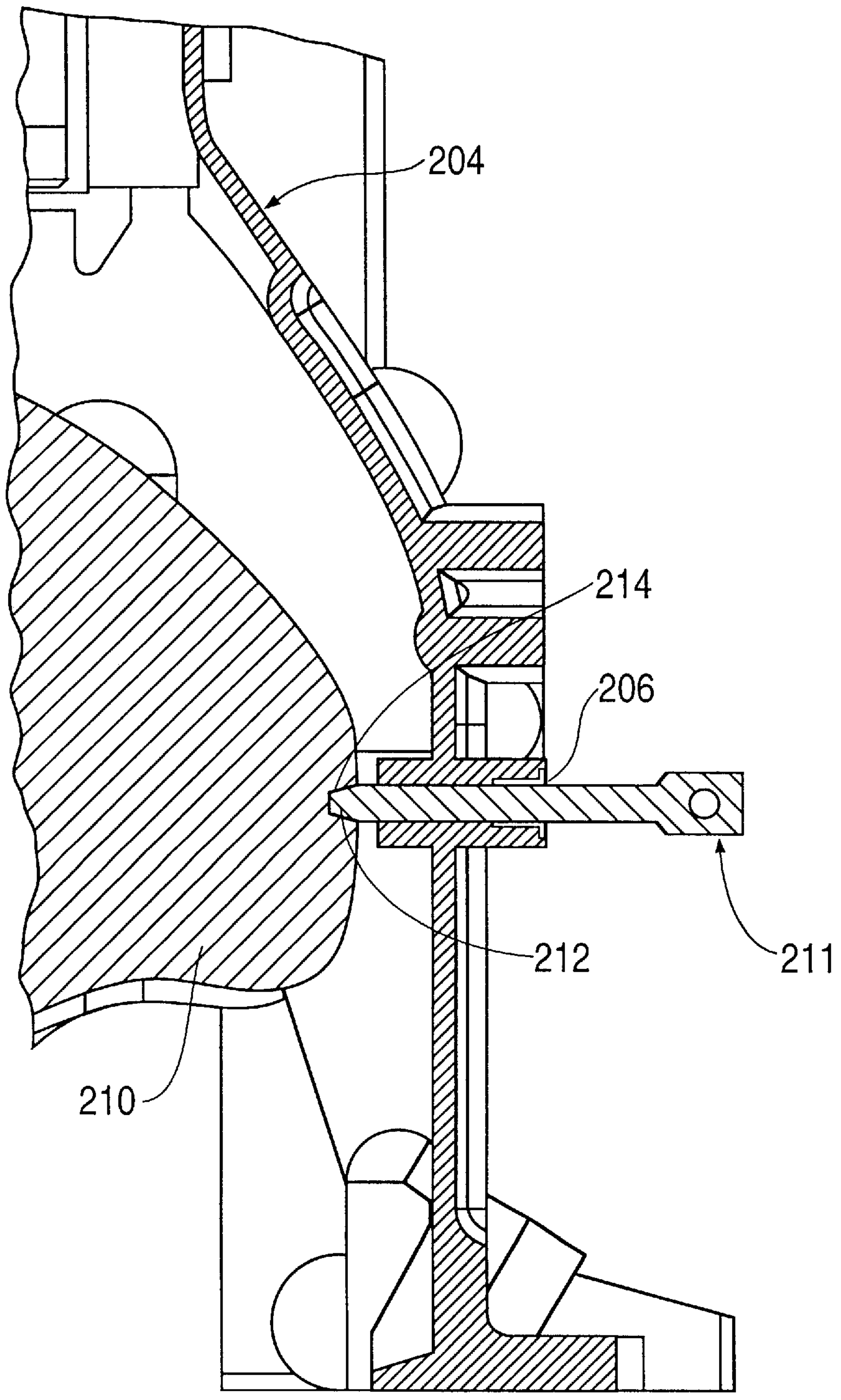
FIG. 5 is a enlarged sectional side view of an alternative embodiment of the crankshaft timing pin of the present invention.

An alternative embodiment of the present invention is illustrated in FIG. 5, where a tapered pin 211 and tapered slot 214 are provided for further improving the timing control of the crankshaft 200. The tapered pin 211 is tapered on at least its end 212 inserted into tapered slot 214, where the tapered shape improves timing control by providing better contact between the tapered pin 211 and the tapered slot 214 to account for deviations due to manufacturing tolerances. When a tapered shape is not utilized, the manufacturing tolerances present when forming a timing pin and a slot can result in an imprecise engagement between the timing pin and the slot, thus allowing the possibility of a gap being present between one of the surfaces of the timing pin and a side surface of the slot. This gap allows for a greater angular variation between the angular position of the slot and the desired rotational position of the crankshaft 200. The tapered shape of the end 212 of the tapered pin 211 and the tapered slot 214 ensures that both sides of the end 212 of the tapered pin 211 will abut the respective side surfaces of tapered slot 214, thereby accounting for manufacturing tolerances of the tapered pin 211 and tapered slot 214 and providing a more precise setting of the tapered slot 214 with respect to the desired rotational position of the crankshaft 200 when the tapered pin 211 is positioned within slot 214. End 212 may be tapered on one or both sides of the tapered pin 211, while tapered slot 214 is preferably formed having a shape substantially the same as end 212 so that the end 212 of the tapered pin 211 is fittingly received within the tapered slot 214. However, tapered slot 214 may include any shape having side surfaces which engage the tapered pin 211 to prevent rotational movement of the crankshaft 200. The tapered shape of the end 212 of tapered pin 211 and tapered slot 214 also allows the tapered slot 214 to be more easily aligned with opening 206 in the engine block 204 and for the tapered pin 211 to be more easily installed when the crankshaft 200 is positioned into the desired static timing position.

Once the crankshaft 200 and camshaft 100 are locked into their desired predetermined positions, the static timing between the crankshaft 200 and camshaft 100 is precisely achieved to provide the proper timing for the engine. A device for driving the camshaft 100 from the crankshaft 200, such as a system of driving gears, is then installed between the crankshaft 200 and camshaft 100. After the driving gears are installed between the crankshaft 200 and camshaft 100, the camshaft timing member 104 and tapered pin 211 are easily removed by simply pulling the camshaft timing member 104 and crankshaft timing pin 202 out from their respective engagement with the camshaft 100 and crankshaft 200.

As can be seen from the foregoing, using the method and apparatus for setting the static timing between a crankshaft and a camshaft in an internal combustion engine in accordance with the present invention will provide a simple, effective, and accurate method of setting the static timing of the engine. Moreover, using the static timing method and apparatus of the present invention reduces the amount of labor and costs associated with accurately setting the timing of the engine during manufacturing and engine service.

Furthermore, using the static timing method and apparatus of the present invention decreases the angular variation between the angular position of the crankshaft and the angular position of the camshaft when positioning the crankshaft and camshaft with respect to each other when setting the static timing.

What is claimed is:

1. A device for setting the static timing of an engine, comprising:

a crankshaft having at least one counterweight including a weighted portion and a crank cheek portion;

a camshaft driven by said crankshaft;

camshaft locking means for locking said camshaft into a predetermined rotational position; and crankshaft locking means for locking said crankshaft into a predetermined rotational position, said crankshaft locking means including a timing pin and a slot formed in said weighted portion of said counterweight for receiving said timing pin, said timing pin engaging said slot formed in said weighted portion of said counterweight to prevent movement of said crankshaft.

2. The static timing device as defined in claim 1, wherein said camshaft locking means comprises a tapered member positioned between said camshaft and an adjacent portion of said engine.

3. The static timing device as defined in claim 2, wherein said camshaft locking means further includes a flat portion formed on an outer surface of said camshaft and said tapered member abuts said flat portion of said camshaft and said adjacent portion of said engine.

4. The static timing device as defined in claim 3, wherein said tapered member includes a linearly tapered side and said flat portion of said camshaft is linearly tapered for complimentary abutment by said linearly tapered side of said tapered member.

5. The static timing device as defined in claim 4, wherein said tapered member includes a rounded side located on an opposite side of said tapered member from said linearly tapered side; said adjacent portion of said engine comprising a rounded shape similar to said rounded side of said tapered member; wherein a portion of said rounded side of said tapered member abuts said rounded adjacent portion of said engine.

6. The static timing device as defined in claim 5, wherein said adjacent portion of said engine comprises a cylinder head.

7. The static timing device as defined in claim 1, wherein said timing pin includes a tapered surface; said slot in said counterweight having a tapered portion with a similar shape to said tapered surface of said timing pin in order to receive said timing pin.

8. The static timing device as defined in claim 7, wherein said timing pin abuts at least one surface of said slot in said counterweight.

9. A device for setting the static timing of an engine, comprising:

a crankshaft having and at least one counterweight;

a camshaft driven by said crankshaft; a flat portion formed on an outer surface of said camshaft;

crankshaft locking means for locking said crankshaft into a predetermined rotational position; and camshaft locking means for locking said camshaft into a predetermined rotational position; said camshaft locking means including a tapered member positioned between said flat portion formed on said camshaft and an adjacent portion of said engine;

wherein said tapered member abuts said flat portion of said camshaft and said adjacent portion of said engine, and said tapered member includes a linearly tapered side and said flat portion of said camshaft is linearly tapered for complimentary abutment by said linearly tapered side of said tapered member.

10. The static timing device as defined in claim 9, wherein said tapered member includes a rounded side located on an opposite side of said tapered member from said linearly tapered side; said adjacent portion of said engine comprising a rounded shape similar to said rounded side of said tapered member; wherein a portion of said rounded side of said tapered member abuts said rounded adjacent portion of said engine.

11. The static timing device as defined in claim 9, wherein said adjacent portion of said engine comprises a cylinder head.

12. The static timing device as defined in claim 9, wherein said crankshaft includes at least one counterweight; said crankshaft locking means includes a timing pin and a slot formed in said counterweight for receiving said timing pin.

13. The static timing device as defined in claim 12, wherein said counterweight includes a slot formed therein for receiving said timing pin.

14. The static timing device as defined in claim 13, wherein said timing pin includes a tapered surface; said slot in said counterweight having a tapered portion with a similar shape to said tapered surface of said timing pin in order to receive said timing pin.

15. The static timing device as defined in claim 14, wherein said timing pin abuts at least one surface of said slot in said counterweight.

16. A device for setting the static timing of an engine, comprising:

a crankshaft having at least one counterweight;

a camshaft driven by said crankshaft;

camshaft locking means for locking said camshaft into a predetermined rotational position; and crankshaft locking means for locking said crankshaft into a predetermined rotational position, said crankshaft locking means engaging said counterweight to prevent movement of said crankshaft;

wherein said camshaft locking means comprises a tapered member positioned between said camshaft and an adjacent portion of said engine and includes a flat portion formed on an outer surface of said camshaft, said tapered member abutting said flat portion of said camshaft and said adjacent portion of said engine and further including a linearly tapered side, said flat portion of said camshaft being linearly tapered for complimentary abutment by said linearly tapered side of said tapered member.

17. The static timing device as defined in claim 16, wherein said tapered member includes a rounded side located on an opposite side of said tapered member from said linearly tapered side; said adjacent portion of said engine comprising a rounded shape similar to said rounded side of said tapered member; wherein a portion of said rounded side of said tapered member abuts said rounded adjacent portion of said engine.

18. The static timing device as defined in claim 17, wherein said adjacent portion of said engine comprises a cylinder head.

19. A method of setting the static timing of an engine, comprising the steps of:

rotating a crankshaft having at least one counterweight into a predetermined rotational position;

positioning a crankshaft timing pin through an engine block into a slot formed in said counterweight of said crankshaft for locking said crankshaft in said predetermined rotational position;

rotating a camshaft into a predetermined rotational position;

positioning a camshaft timing member between said camshaft and an adjacent portion of said engine so as to secure said camshaft in said predetermined rotational position;

wherein said counterweight includes a weighted portion and a crank cheek portion, said weighted portion of said counterweight includes a slot formed for receiving said timing pin.

20. The method of claim 19, wherein said camshaft includes a flat portion formed on an outer peripheral surface, said camshaft timing member being positioned between said flat portion of said camshaft and said adjacent portion of said engine.

21. The method of claim 19, wherein said adjacent portion of said engine comprises a cylinder head.

22. The method of claim 20, wherein said flat portion of said camshaft is formed in a single manufacturing set with the forming of cam lobes on said camshaft.

23. The method of claim 19, wherein said crankshaft timing pin is tapered for more effectively locking said crankshaft in said predetermined rotational position.

24. The method of claim 19, wherein said camshaft timing member is tapered for more effectively locking said camshaft in said predetermined rotational position.

25. A method of setting the static timing of an engine, comprising the steps of:

rotating a crankshaft into a predetermined rotational position;

positioning a crankshaft timing pin through an engine block into a slot formed in said crankshaft for locking said crankshaft in said predetermined rotational position;

rotating a camshaft into a predetermined rotational position; said camshaft including a flat portion formed on an outer peripheral surface of said camshaft; and positioning a camshaft timing member between said flat portion of said camshaft and an adjacent portion of said engine so as to secure said camshaft in said predetermined rotational position;

wherein said camshaft includes a linearly tapered flat portion formed on an outer surface, said camshaft timing member includes a linearly tapered side, said linearly tapered side of said camshaft timing member complimentarily abutting said linearly tapered flat portion of said camshaft when said camshaft timing member is positioned between said camshaft and an adjacent portion of said engine.

26. The method of claim 25, wherein said adjacent portion of said engine comprises a cylinder head.

27. The method of claim 25, wherein said flat portion of said camshaft is formed in a single manufacturing set with the forming of cam lobes on said camshaft.

28. The method of claim 25, wherein said crankshaft timing pin is tapered for more effectively locking said crankshaft in said predetermined rotational position.

29. The method of claim 25, wherein said camshaft timing member is tapered for more effectively locking said camshaft in said predetermined rotational position.

30. The method of claim 25, wherein said crankshaft includes a crank pin for receiving a connecting rod, and at least one counterweight, said counterweight including a weighted portion and a crank cheek portion, said slot being formed in said weighted portion of said counterweight and said crankshaft timing pin being positioned into said slot formed in said weighted portion of said counterweight of said crankshaft for locking said crankshaft in said predetermined rotational position.

31. A device for setting the static timing of an engine, comprising:

a crankshaft having at least one counterweight;

a camshaft driven by said crankshaft; a flat portion formed on an outer surface of said camshaft;

crankshaft locking means for locking said crankshaft into a predetermined rotational position; and camshaft locking means for locking said camshaft into a predetermined rotational position; said camshaft locking means including a tapered member positioned between said flat portion formed on said camshaft and an adjacent portion of said engine;

wherein said tapered member abuts said flat portion of said camshaft and said adjacent portion of said engine and includes a linearly tapered side and said flat portion of said camshaft is linearly tapered for complimentary abutment by said linearly tapered side of said tapered member.

32. The static timing device as defined in claim 31, wherein said tapered member includes a rounded side located on an opposite side of said tapered member from said linearly tapered side; said adjacent portion of said engine comprising a rounded shape similar to said rounded side of said tapered member; wherein a portion of said rounded side of said tapered member abuts said rounded adjacent portion of said engine.

* * * * *